（12）United States Patent
Wakabayashi et al.

(10) Patent No.: US 9,679,679 B2
(45) Date of Patent: Jun. 13, 2017

(54) ELECTRICAL LINE EXTERIOR STRUCTURE FOR WIRE HARNESS

(71) Applicant: Sumitomo Wiring Systems, Ltd, Yokkaichi, Mie (JP)

(72) Inventors: Masataka Wakabayashi, Mie (JP); Minoru Fukuda, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/064,893

(22) Filed: Mar. 9, 2016

(65) Prior Publication Data

US 2017/0025201 A1    Jan. 26, 2017

(30) Foreign Application Priority Data

Mar. 10, 2015  (JP) ................... 2015-047474

(51) Int. Cl.
*H01B 7/00* (2006.01)
*H01B 7/282* (2006.01)

(52) U.S. Cl.
CPC ........... *H01B 7/282* (2013.01); *H01B 7/0045* (2013.01)

(58) Field of Classification Search
CPC ........ B60R 16/02; B60R 16/0215; E03F 1/00; E03F 5/02; F16L 1/024; H01B 7/282; H01B 7/0045; H01B 7/288; H01B 7/2813; H01B 9/02; H02G 1/06; H02G 3/088; H02G 3/22; H02G 3/0481; H02G 9/10; H02G 15/117; C09J 7/0207; C09J 7/0232; C09J 2201/32; C09J 2201/606; C09J 2201/20;

(Continued)

(56) References Cited

U.S. PATENT DOCUMENTS 4,647,719 A * 3/1987 Campbell ............ H02G 15/117
                                                          156/48
5,010,209 A * 4/1991 Marciano-Agostinelli
                                        ............................ H01B 7/2813
                                                          174/102 SC (Continued)

FOREIGN PATENT DOCUMENTS

JP      H07-105742 A       4/1995
JP      2002335613 A  * 11/2002

(Continued)

*Primary Examiner* — Timothy Thompson
*Assistant Examiner* — Guillermo Egoavil
(74) *Attorney, Agent, or Firm* — Dinsmore & Shohl LLP

(57) ABSTRACT

An electrical line exterior structure for a wire harness is provided that allows water accumulated in a gap formed between adjacent electrical lines or between an exterior member and a group of electrical lines to quickly drain. A tape-like exterior member is wrapped around insulated electrical lines. The exterior member includes a base layer having multiple water suction openings open on the inner circumferential surface that faces the electrical lines, and multiple water suction tube portions that protrude on the outer circumferential surface side of the base layer, and a capillary structure having water suction holes in communication with the water suction openings. When water comes into contact with the electrical lines, negative pressure is generated by capillary action of the water suction holes on the base layer side, and water inside the water suction holes is vaporized on the protruding end side of the water suction tube portions.

3 Claims, 4 Drawing Sheets

(58) Field of Classification Search
CPC ....... Y10T 428/2848; Y10T 428/24174; Y10T 428/1405; H01M 8/004; H01M 8/0247
USPC ............ 29/825; 156/48, 49; 174/23 R, 23 C, 174/70 R, 72 A, 78, 88 R, 93, 105 SC, 174/102 SC; 205/347; 277/616; 428/37, 428/192, 466, 41.8, 99
See application file for complete search history.

(56) References Cited

U.S. PATENT DOCUMENTS

| | | | | |
|---|---|---|---|---|
| 5,641,942 | A * | 6/1997 | Iriyama | ............... B60R 16/0215 174/23 R |
| 2011/0083899 | A1* | 4/2011 | Mori | ................... B60R 16/0215 174/72 A |
| 2013/0288150 | A1* | 10/2013 | Hodges | ................. H01M 8/243 429/466 |
| 2014/0353926 | A1* | 12/2014 | Fukuda | ............... B60R 16/0222 277/616 |

FOREIGN PATENT DOCUMENTS

| | | | |
|---|---|---|---|
| JP | 2004346302 A | 12/2004 |
| JP | 2005220180 A | 8/2005 |

* cited by examiner

ELECTRICAL LINE EXTERIOR STRUCTURE FOR WIRE HARNESS

CROSS-REFERENCE TO RELATED APPLICATIONS

This application claims priority to Japanese Patent Application No. JP2015-047474 filed Mar. 10, 2015.

FIELD OF THE INVENTION

The present invention relates to an electrical line exterior structure for a wire harness, and in particular relates to an electrical line exterior structure for a wire harness in which a group of electrical lines is covered by an exterior member in a predetermined routing section.

BACKGROUND OF THE INVENTION

In the case of bundling together multiple insulated covered electrical lines (hereinafter, simply referred to as "a group of electrical lines") in a wire harness provided in a vehicle, adhesive tape or an adhesive sheet is often wrapped around the group of electrical lines, and various proposals have been made regarding how the exterior member such as the sheet or tape is wrapped around the group of electrical lines, and regarding the material and structure of the exterior member in order to obtain a desired protection function or the like.

In one electrical line exterior structure for a wire harness of this type, for example, multiple fibrous protruding structure portions that protrude from the surface of an adhesive layer are provided at a predetermined interval, and the fibrous protruding structure portions are given detachability so as to solve the prior problem of a reduction in the reliability of the adhesive layer due to water-swelling particles, while also making it easy to perform temporary fixing and wrapping position correction. (e.g., see JP 2005-220180A).

Also, there is known to be an example in which, in consideration of the height positions of various portions in the routed orientation of the group of electrical lines, changes in pressure that occur in the periphery of the group of electrical lines during vehicle traveling, and the like, the wrapping pitch of the adhesive tape is set looser in the lowermost portion, waterproof tape is wrapped around the intermediate portion, and a sheet made of resin is wrapped around the uppermost portion side and the wrapping pitch of waterproof tape provided thereon is set densely, thus improving the waterproofness (e.g., see JP H7-105742A).

JP 2005-220180A and JP H7-105742A are examples of related art.

However, in conventional electrical line exterior structures for a wire harness, the exterior member itself is formed using a material that blocks water or a material that water does not easily pass through, and therefore there has been a problem in that when the group of electrical lines comes into contact with water and water accumulates in the gaps between adjacent electrical lines or the gaps between the exterior member and the group of electrical lines, the water cannot easily drip out, and a long amount of time is required for drying of the wire harness.

In view of this, an object of the present invention is to provide an electrical line exterior structure for a wire harness that has excellent water draining ability and that allows water that has accumulated in a gap between adjacent electrical lines or a gap between the exterior member and the group of electrical lines to be drained in a short amount of time.

SUMMARY OF THE INVENTION

In order to achieve the above object, an electrical line exterior structure for a wire harness according to the present invention is an electrical line exterior structure for a wire harness in which a sheet-like exterior member is wrapped around an insulated and covered electrical line, the exterior member including: a base layer in which a plurality of water suction openings are formed so as to be open on an inner circumferential surface that faces the electrical line; and a plurality of water suction tube portions that are provided so as to protrude on an outer circumferential surface side of the base layer, and have a capillary structure in which water suction holes in communication with any one of the plurality of water suction openings are formed in inner circumferential portions that correspond to the plurality of water suction openings, wherein when water comes into contact with the electrical line on the inner circumferential surface side of the base layer, negative pressure is generated by capillary action of the water suction holes on the base layer side, and water inside the water suction holes is vaporized on a protruding end side of the plurality of water suction tube portions.

According to this configuration, when the electrical line comes into contact with water, the water adsorbed to the electrical line is suctioned upward by the water suction holes that exhibit capillary action through the water suction openings that are open on the inner circumferential surface of the base layer of the exterior member that is wrapped around the electrical line. Also, on the protruding end side of the water suction tube portions, the capillary action inside the water suction holes is promoted by the water inside the water suction holes being vaporized. Accordingly, the electrical line exterior structure for a wire harness has excellent water draining ability and allows water that has accumulated in a gap between adjacent electrical lines or a gap between the exterior member and the group of electrical lines to be drained in a short amount of time.

In the electrical line exterior structure for a wire harness according to the present invention, it is preferable that a vaporization promoting shape portion that increases the area of an inner wall surface per unit length of the water suction hole and disrupts surrounding airflow is provided on the protruding end side of each of the plurality of water suction tube portions.

In this case, on the protruding end side of the water suction tube portions on which the vaporization promoting shape portions are formed, the heat transfer efficiency between the exterior member and the water is improved, cohesion and surface tension improve in the water inside the water suction holes where vaporization heat is lost, and capillary action inside the water suction holes is promoted.

Also, for example, when airflow such as traveling wind hits the electrical line during the traveling of a vehicle equipped with the wire harness, capillary action in the water suction tube portions of the exterior member is improved, it is possible to obtain a dewatering effect in which water is successively suctioned up through the water suction openings by the water suction holes, and it is possible to shorten the amount of time required for drying of the electrical line after coming into contact with water.

Furthermore, in the electrical line exterior structure for a wire harness according to the present invention, it is preferable that a plurality of slits are provided on the protruding end side of each of the plurality of water suction tube portions, the plurality of slits extending in a length direction of the water suction hole and being separated from each other in an inner circumferential direction of the water suction hole.

According to this configuration, vaporization of the water suctioned up through the water suction holes is sufficiently promoted, and desired water draining ability is obtained.

According to the present invention, it is possible to provide an electrical line exterior structure for a wire harness that has excellent water draining ability and that allows water that has accumulated in a gap between adjacent electrical lines or a gap between the exterior member and the group of electrical lines to be drained in a short amount of time.

EMBODIMENTS OF THE INVENTION

Hereinafter, embodiments for carrying out the present invention will be described with reference to the drawings.

Figure 1:
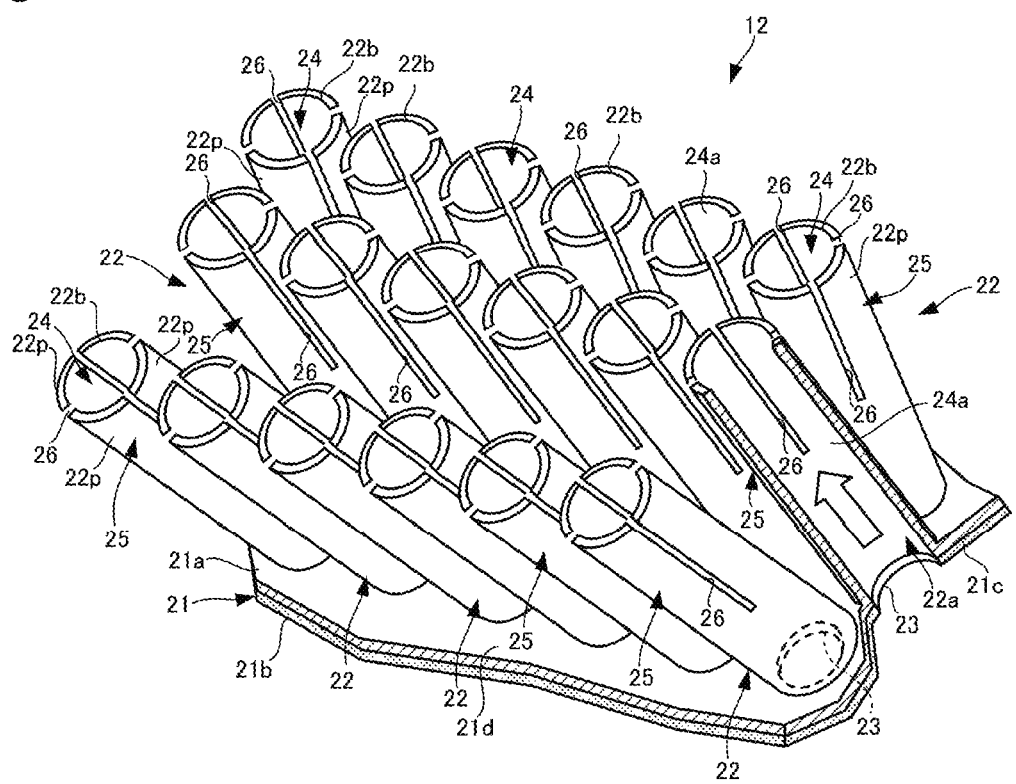
FIG. 1 is a partial enlarged perspective view of a relevant portion of an electrical line exterior structure for a wire harness according to a first embodiment of the present invention.
Figure 2:
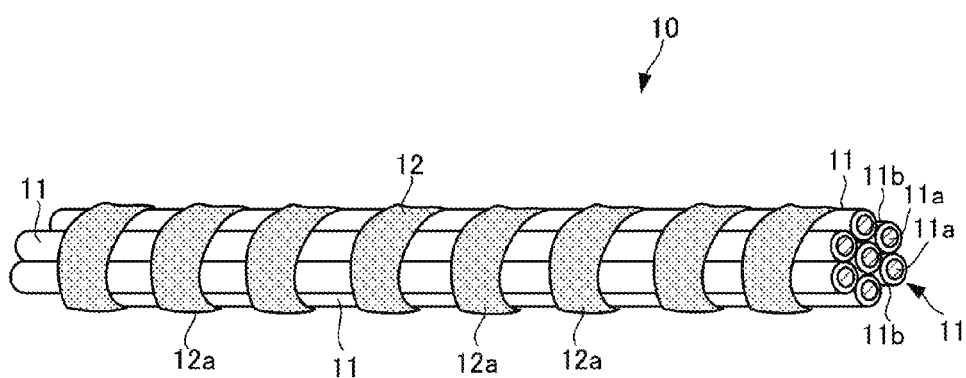
FIG. 2 is a perspective view of a state in which an exterior member is wrapped around electrical lines in the electrical line exterior structure for a wire harness according to the first embodiment of the present invention.
Figure 3:
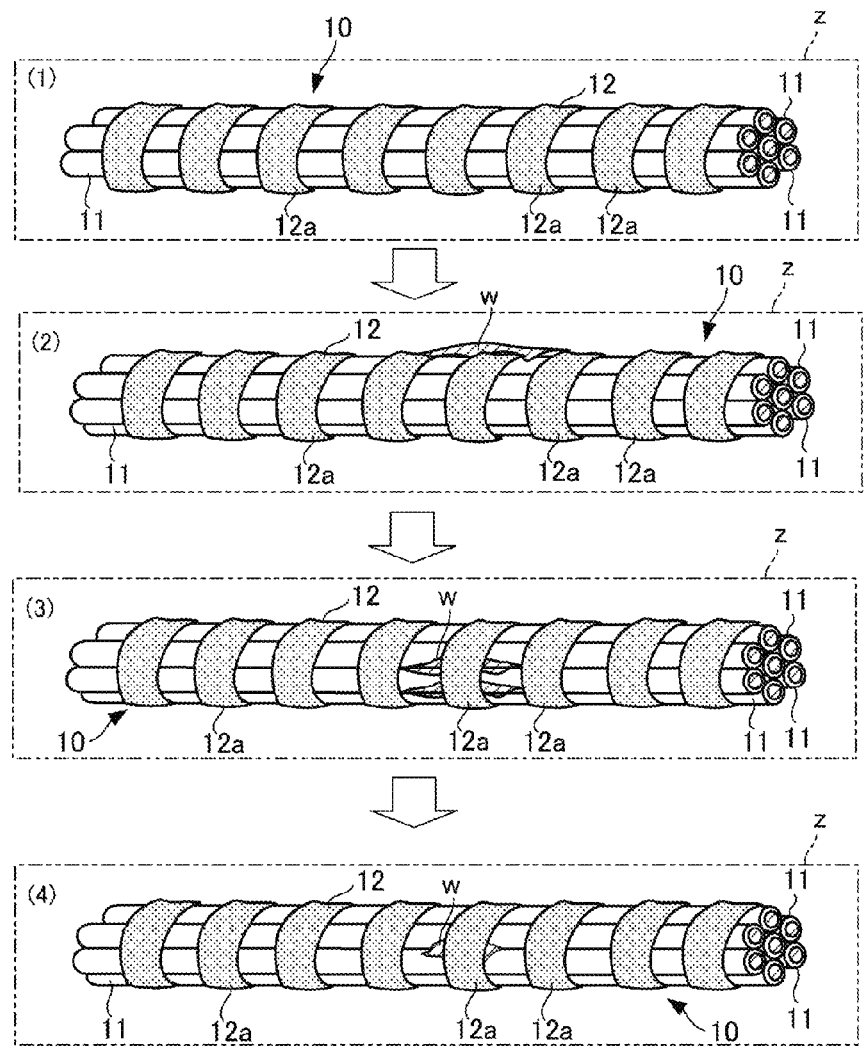
FIG. 3 is a diagram illustrating actions of the electrical line exterior structure for a wire harness according to the first embodiment of the present invention.

FIGS. 1 to 3 show a first embodiment of the present invention, and in the present embodiment, the present invention is applied to an electrical line exterior structure for a wire harness provided in a vehicle.

First, the configuration of the present embodiment will be described.

FIGS. 1 and 2 show an electrical line exterior structure for a wire harness according to the first embodiment of the present invention.

A wire harness 10 of the present embodiment includes multiple electrical lines 1 that make up a group of electrical lines that are insulated and covered, and a tape-like (in the form of a band-shaped sheet) exterior member 12 that is wrapped in a spiral manner around the electrical lines 11 so as to bundle the electrical lines 11 together. In other words, the wire harness 10 has an exterior structure in which the tape-like exterior member 12 is wrapped around the electrical lines 11 that are insulated and covered.

This wire harness 10 is a unit obtained by attaching connection terminals, connectors, or the like (not shown) to the electrical lines 11, and is constituted so as to be able to connect an electrical device installed in the vehicle to a power supply, a control device, or the like.

Also, this wire harness 10 is routed so as to, for example, extend from a water-exposed region in the vehicle (e.g., the engine room) to the vehicle compartment, which is a water-non-exposed region, and FIG. 2 shows a portion of the wire harness 10 in the engine room, which is on the water-exposed region side. The electrical lines 11 each have a linear conductor 11a and a tube-shaped covering 11b that surrounds the conductor 11a, and although the conductor 11a is constituted by a circular twisted wire obtained by twisting together multiple element wires that are annealed copper wires, for example, there is no need to use a twisted wire, and a configuring using a single-line core line is also possible. The covering 11b is constituted by a cylindrical insulating material made of a resin whose main component is polyvinyl chloride, polyethylene, or the like.

The exterior member 12 is wrapped in a spiral manner around the electrical lines 11 of the wire harness 10 before mounting to the vehicle body (before routing), in a predetermined routing section arranged in the aforementioned water-exposed region. Note that FIG. 2 shows a so-called loosely wrapped state in which there is no overlap between wrapping portions 12a that correspond to one turn of the exterior member 12 and are adjacent in the length direction of the electrical line 11, and the wrapping pitch is loose to the extent of enabling separation in the length direction of the electrical line 11.

This exterior member 12 is made of a resin whose main component is polyvinyl chloride, polyethylene, or the like, or is made of a resin whose main component is polypropylene or urethane, and is water-permeable (specifically, has later-described dewatering ability) so as to allow water to be drained from the wrapping inner circumferential side to the outer circumferential side.

Specifically, as shown in the partial enlarged view in FIG. 1, the exterior member 12 includes a tape-like base layer 21 that is wrapped around the electrical lines 11, and multiple water suction tube portions 22 provided so as to protrude on an outer circumferential surface 21d side of the base layer 21.

The base layer 21 is obtained by stacking an adhesive layer 21b on one surface of a tape base 21a that is made of resin, is flexible, and has a thickness of approximately 0.1 mm, for example, and the base layer 21 opposes the electrical lines 11 on the one surface side on which the adhesive layer 21b is provided. Accordingly, the exterior member 12 is wrapped around the electrical lines 11, as well as adhered to the electrical lines 11.

Also, multiple circular water suction openings 23 are formed in the base layer 21 so as to be open on an inner circumferential surface 21c that opposes the electrical lines 11, and the water suction openings 23 are formed in a parallel mode of being aligned with a predetermined pitch in the tape width direction of the exterior member 12 and being adjacent with a predetermined pitch in the tape length direction.

The water suction tube portions 22 are provided so as to protrude on the outer circumferential side of the base layer 21 in correspondence with the water suction openings 23, and have a capillary structure in which water suction holes 24 in communication with any one of the water suction openings 23 are formed in inner circumferential portions 22a that correspond to the water suction openings 23.

According to the water suction holes 24, when an electrical line 11 on the inner circumferential surface 21c side of the base layer 21 comes into contact with water, negative pressure relative to that electrical line 11 is generated inside the water suction hole 24 by capillary action of the water suction hole 24 on the base layer 21 side, and water inside the water suction holes 24 on protruding end 22b sides of the water suction tube portions 22 is vaporized.

The total length of the water suction hole 24 from the inner circumferential surface 21c of the base layer 21 including the water suction opening 23 is, for example, approximately 5 times to 10 times the layer thickness of the base layer 21, that is to say, approximately 0.5 mm to 1.0 mm, for example. Also, the opening diameter of the water suction opening 23 is approximately half the total length of the water suction opening 23 or less, that is to say, 0.3 mm or less for example, and the arrangement pitch of the water suction openings 23 is smaller than the aforementioned total length of the water suction hole 24.

A vaporization promoting shape portion 25, which increases the area of an inner wall surface 24a per unit length of the water suction hole 24 and improves the heat transfer efficiency by disrupting the surrounding airflow, is provided on the protruding end 22b side of the water suction tube portions 22.

The vaporization promoting shape portion 25 has multiple slits 26, which extend in the length direction of the water suction hole 24 and are separated from each other in the inner circumferential direction of the water suction hole 24, on the protruding end 22b side of the water suction tube portions 22. Accordingly, the water suction tube portions 22 are each made up of four protruding pieces 22p that have quadrant-shaped circular arc cross-sections on the protruding end 22b side, thus obtaining flexibility to the extent of being able to easily flex due to airflow.

Here, the number of protruding pieces 22p and the number of slits 26 are both four in order to allow the protruding pieces 22p to flex approximately uniformly regardless of the direction of airflow with respect to the water suction tube portion 22. Note that the number of protruding pieces 22p and the number of slits 26 may each be a high number as five or more, or may be a low number as three or fewer.

The slit depth of each slit 26 is half the length of the corresponding water suction tube portion 22 or less, but need only be at least the thickness of the base layer 21 or more, and is preferably the opening diameter of the water suction opening 23 or more.

Next, actions will be described.

In the present embodiment configured as described above, the electrical lines 11 arranged in a water-exposed region Z of a vehicle as shown in state 1 in FIG. 3 can come into contact with water as shown in state 2 in FIG. 3.

When the electrical lines 11 come into contact with water, it is possible for a condition in which a portion of water W is held by absorption to gaps between the electrical lines 11 or gaps between the exterior member 12 and the electrical lines 11 as shown in state 3 in FIG. 3.

In this state, in the present embodiment, the water W adsorbed to the electrical lines 11 is suctioned upward by the water suction holes 24 that exhibit capillary action through the water suction openings 23 that are open on the inner circumferential surface 21c of the base layer 21 of the exterior member 12 that is wrapped around the electrical lines 11, as shown by the white arrow in FIG. 1.

Also, the heat transfer efficiency in the vaporization promoting shape portions 25 on the protruding end 22b side of the water suction tube portions 22 is good, and vaporization of the water in the water suction holes 24 is promoted by airflow such as traveling wind. The cohesion and surface tension increase in the water located on the outer end side of the water suction holes 24 as it loses vaporization heat, and capillary action of the water suction holes 24 is promoted.

Accordingly, even if the water W accumulates in gaps between adjacent electrical lines 11 or gaps between the exterior member 12 and the electrical lines 11, that water W decreases in amount as shown in state 4 in FIG. 3 in a short amount of time, and can be further reliably drained.

Also, in the present embodiment, the water suction tube portions 22 are provided with the vaporization promoting shape portion 25 that increases the area of the inner wall surface 24a on the protruding end 22b side and disrupts the surrounding airflow, thus improving the heat transfer efficiency between the exterior member 12 and the water W, increasing the cohesion and surface tension of the water W in the water suction holes 24 that lose vaporization heat, and sufficiently promoting the capillary action in the water suction holes 24.

Accordingly, when airflow such as traveling wind hits the electrical lines 11 during the traveling of a vehicle equipped with the wire harness 10, capillary action in the water suction tube portions 22 of the exterior member 12 is improved, and it is possible to obtain a dewatering effect in which water is successively suctioned up through the water suction openings 23 by the water suction holes 24. As a result, it is possible to significantly shorten the amount of time required for drying the electrical lines 11 after coming into contact with water.

Furthermore, in the present embodiment, the slits 26 that extend in the length direction of the water suction holes 24 and are separated from each other in the inner circumferential direction of the water suction holes 24 are formed on the protruding end 22b side of the water suction tube portions 22. Accordingly, vaporization of the water W suctioned up through the water suction holes 24 is sufficiently promoted, and desired water draining ability is obtained.

In this way, according to the present embodiment, it is possible to provide an electrical line exterior structure for a wire harness that has excellent water draining ability and allows the water W accumulated in gaps between adjacent electrical lines 11 or gaps between the exterior member 12 and the electrical lines 11 to be drained in a short amount of time.

Figure 4:
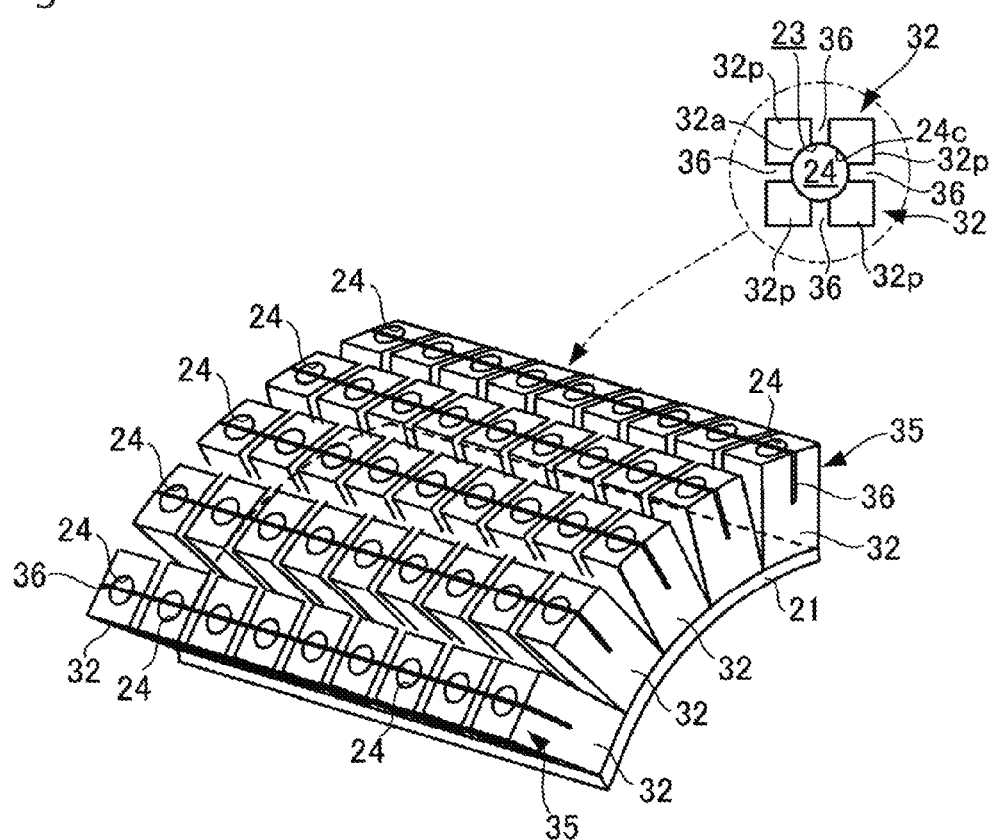
FIG. 4 is a partial enlarged perspective view of a relevant portion of an electrical line exterior structure for a wire harness according to a second embodiment of the present invention.

FIG. 4 is a partial enlarged perspective view of a relevant portion of an electrical line exterior structure for a wire harness according to a second embodiment of the present invention.

In the present embodiment, the shape of the outer surface of the exterior member is different from the first embodiment described above, but the water suctioning function, manner of wrapping the group of electrical lines, and the like are the same as in the first embodiment. Accordingly, in the following, configurations the same as or similar to those in the first embodiment are denoted by the reference signs of the corresponding constituent elements in the first embodiment shown in FIGS. 1 to 3, and only differences from the first embodiment will be described.

In the first embodiment, the water suction tube portions 22 of the exterior member 12 have an approximately cylindrical shape in which the base side is supported on the base layer 21. In contrast, in the present embodiment, water suction tube portions 32 of the exterior member 12 are supported on the base layer 21 on the base end side, and at least the outer circumferential surface of the water suction tube portions 32 has a polygonal transverse cross-section.

Specifically, similarly to the first embodiment, the exterior member 12 of the present embodiment includes the tape-like base layer 21 that is wrapped in a spiral manner around the predetermined routing section of the electrical lines 11, and multiple water suction tube portions 32 provided so as to protrude on the outer circumferential side of the base layer 21.

The water suction tube portions 32 are provided so as to protrude on the outer circumferential surface 21d side of the base layer 21 in correspondence with the water suction openings 23, and have a capillary structure in which water suction holes 24 in communication with any one of the water suction openings 23 are formed in inner circumferential portions 32a that correspond to the water suction openings 23.

Although the water suction holes 24 have the same shape as in the first embodiment, they may have a quadrangular transverse cross-section, such as a transverse cross-section that approximately resembles the outer circumferential surface of the water suction tube portion 32, instead of a circular transverse cross-section. Also, multiple (e.g., a pair of) water suction holes 24 may be formed in each of the water suction tube portions 32.

A vaporization promoting shape portion 35 formed on a protruding end 32b side of the water suction tube portion 32 has multiple slits 36, which extend in the length direction of the water suction hole 24 and are separated from each other in the inner circumferential direction of the water suction hole 24. Accordingly, the water suction tube portions 32 are each made up of four protruding pieces 32p that have arrow tip-shaped transverse cross-sections on the protruding end 32b side, thus obtaining flexibility to the extent of being able to easily flex due to airflow.

In the present embodiment as well, it is possible to provide an electrical line exterior structure for a wire harness that has excellent water draining ability and allows the water W accumulated in gaps between adjacent electrical lines 11 or gaps between the exterior member 12 and the electrical lines 11 to be drained in a short amount of time.

Note that although the exterior member 12 is tape-like with a constant tape width in the embodiments described above, it may be shaped as a sheet, such as a sheet shape with a width approximately the same as the outer circumference of the group of electrical lines, and a length that is approximately several times the width or less. Also, the exterior member 12 may be wrapped in a partially overlapping manner, for example.

Also, although the water suction tube portions 22 and 32 are illustrated as protruding perpendicularly from the base layer 21, they may protrude in a direction inclined relative to the base layer 21.

Furthermore, although the base layer 21 has the adhesive layer 21b, the adhesive layer may be omitted. In this case, the two end portions of the exterior member 12 wrapped in a spiral manner may be fixed to the electrical lines with tape, for example, or the two side edge portions in the wrapping direction of the sheet-like exterior member may be joined using tape or an adhesive.

As described above, according to the present invention, it is possible to provide an electrical line exterior structure for a wire harness that has excellent water draining ability and that allows water that has accumulated in a gap between adjacent electrical lines or a gap between the exterior member and the group of electrical lines to be drained in a short amount of time. The present invention is useful to general electrical line exterior structures for wire harnesses in which a group of electrical lines are covered by an exterior member in a predetermined routing section.

The invention claimed is:

1. An electrical line exterior structure for a wire harness in which a sheet-like exterior member is wrapped around an insulated and covered electrical line,
the exterior member comprising:
a base layer in which a plurality of water suction openings are formed so as to be open on an inner circumferential surface that faces the electrical line; and
a plurality of water suction tube portions that are provided so as to protrude on an outer circumferential surface side of the base layer, and have a capillary structure in which water suction holes in communication with any one of the plurality of water suction openings are formed in inner circumferential portions that correspond to the plurality of water suction openings,
wherein when water comes into contact with the electrical line on the inner circumferential surface side of the base layer, negative pressure is generated by capillary action of the water suction holes on the base layer side, and water inside the water suction holes is vaporized on a protruding end side of the plurality of water suction tube portions.

2. The electrical line exterior structure for a wire harness according to claim 1, wherein a vaporization promoting shape portion that increases the area of an inner wall surface per unit length of the water suction hole and disrupts surrounding airflow is provided on the protruding end side of each of the plurality of water suction tube portions.

3. The electrical line exterior structure for a wire harness according to claim 2, wherein a plurality of slits are provided on the protruding end side of each of the plurality of water suction tube portions, the plurality of slits extending in a length direction of the water suction hole and being separated from each other in an inner circumferential direction of the water suction hole.

* * * * *